Dec. 11, 1923.
J. W. IVORY
1,476,975
DENTAL MATRIX CLAMP
Filed May 31, 1921
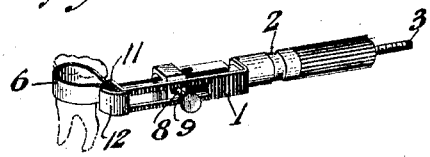
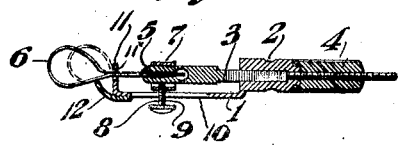
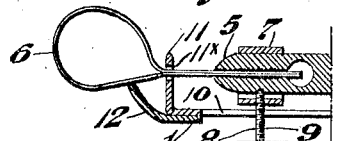
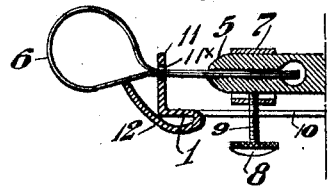
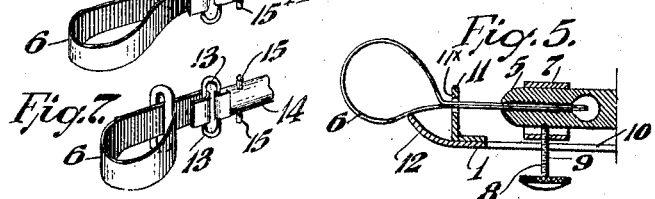
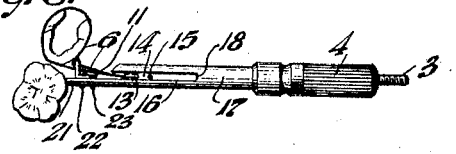
INVENTOR:
James W. Ivory
BY Wiedersheim + Fairbanks
ATTORNEYS Patented Dec. 11, 1923.

1,476,975

UNITED STATES PATENT OFFICE.

JAMES W. IVORY, OF PHILADELPHIA, PENNSYLVANIA.

DENTAL MATRIX CLAMP.

Application filed May 31, 1921. Serial No. 473,576.

*To all whom it may concern:*

Be it known that I, JAMES W. IVORY, a subject of the King of Great Britain, residing in the city and county of Philadelphia, State of Pennsylvania, have invented a new and useful Dental Matrix Clamp, of which the following is a specification.

My invention consists of a dental matrix retainer, the same embodying novel means for closing the matrix and retaining it firmly on a tooth, and details of mechanism as will be hereinafter described.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a dental matrix retainer embodying my invention.

Figure 2 represents a longitudinal section thereof.

Figure 3 represents a longitudinal sectional view of a portion on an enlarged scale.

Figures 4 and 5 represent longitudinal sections of portions of modified forms.

Figures 6 and 7 represent perspective views of a matrix and connections on an enlarged scale.

Figure 8 represents a side elevation of another embodiment of the invention.

Similar numerals of reference indicate corresponding parts in the figures.

Referring to the drawing.

1 designates an arm which extends from the tubular stock 2 whose bore is screw threaded and receives the screw threaded slidable stem 3, the latter also passing through the interiorly threaded rotatable sleeve 4 which is swivelled on said stock 2 and is exteriorly milled for convenience of operating said sleeve.

Connected with the stem 3 at the end opposite to its threaded portion are the resilient jaws 5 which are adapted to receive the terminal legs of the matrix 6, the latter thus being mounted on said stem 3 as its carrier, the loop portion of the matrix being appliable to a tooth and adapted to embrace tightly the same, as known in the art.

Encircling said jaws 5 is the yoke 7 one side of which has fitted to it the screw 8 whose threaded shank 9 passes freely through the longitudinally extending slot 10 in the arm 1 so that in the motions of the stem 3, said screw may slide in said slot, it being noticed that when the screw is properly rotated it is adapted to cause the yoke 7 to close the jaws 5 and so clamp the legs of the matrix and cause a firm connection of the matrix with said jaws and consequently with the stem 3.

On the outer end of the arm 1 is the angular plate 11 in which is the eye 11× through which the adjacent portions of the legs of the matrix are passed and in which they may ride, during the closing operation of the matrix on the tooth, said plate being adapted to have a bearing on the contiguous portion of the matrix by a convex face for purposes hereinafter described.

To the outer end of the arm 1 adjacnt to the eye 11 is secured the tongue 12 which projects forward from said end as to engage with the outer side of the body of the matrix and bear firmly thereagainst, thus serving to cause the matrix to be pressed against the tooth and this with the closing motions of the matrix causes the latter to be held most firmly on the tooth, assisted by the bearing of the plate 11 against the contiguous portion of the matrix and acting as an abutment for the screw force.

In the embodiment shown in Figure 4, the tongue 12 is punched out of the material of the arm 1 and turned up therefrom without producing results different from what is shown in Figures 1, 2, and 3.

In the embodiment shown in Figure 5, the tongue 12 is an extension of the arm 1 beyond the plate 11, and the latter is secured to said arm 1 while in Figures 1, 2, and 3, the plate 11 is an integral portion of said arm 1 and has a bearing against the tooth as has been stated.

In the embodiment shown in Figures 6 and 7, the matrix is adapted to be hooked upon the clevis 13, and the latter is adapted to be hooked upon the adjacent member 14 of the stem 3. Projecting from said member are the pins 15 which are adapted to pass through the slots 16 in the tubular body 17 which is employed in lieu of the arm 1 and adapted to abut against the shoulders 18 on the inner terminals of said slots to limit the motion of the stem 3 when the matrix is being opened by the operation of the sleeve 4. In said Figures 6 and 7 the tongue 12 and connected members have been omitted.

The terminal edge of the angular plate 11 has the corners of the metal beveled off, leaving said terminal edge high in the center giving a convexity to this face so that as it rests against the contiguous portion of the matrix and the corners of this face do not impinge on the gum whether used on the right or on the left side of the mouth. I have spoken of this plate as an abutment for the screw force as it rests against the band; I say further that it extends perpendicularly with the tooth as it rests against the contiguous portion of the matrix on the buccal angle or corner of the tooth extending into the V-space between the teeth and holds the relative portion of the matrix against the surface of the tooth as the matrix is tightened by the screw tension of the retainer. The terminal end of the tongue 12 adjacent to this plate rests against the other side of the matrix on the outer corner or angle of the face of the tooth opposite to the other end of the band, just as the two legs of the matrix passes into the eye 11ˣ in the plate 11. By this mechanical construction both ends of the matrix meet to form almost a complete circle around the tooth, and are held by this tongue against the tooth on this side as the plate 11 holds it on the other side as it passes into the eye of the plate 11 so that the legs of the matrix may be clamped or otherwise held as the matrix is drawn uniformly to its position on the tooth which it encircles, whereby an operation of filling a cavity of decay or taking an impression of any cavity on the crown surface of a tooth may be performed and the interference of the occlusion of the teeth is not hindered by this complete device.

In operating the tension nut 4 in the reverse direction the matrix is loosened on the tooth and hence may be readily removed either by loosening the screw 8 on the resilient jaws 5 or by clipping the matrix band on the lingual side of the same.

Having thus described my invention what I claim as new and desire to secure by Letters Patent, is:—

1. In a dental matrix retainer, a movable carrier for the matrix, a supporting member for said carrier, and means for operating said carrier, and a tongue which is connected with said supporting member and adapted to engage tightly the side of the body of the matrix.

2. In a dental matrix retainer, a movable stem adapted to have the legs of a matrix connected therewith, a stock adapted to carry said stem, an arm on said stock, and a tongue connected with said arm adapted to engage tightly the side of the body of the matrix.

3. In a dental matrix retainer, a movable stem adapted to have the legs of a matrix clamped thereto and carried thereby, a stock adapted to carry said stem, a nut-like sleeve 4 adapted to move said stem and consequently the matrix, an arm on said stock, an eye plate on said arm, the legs of the matrix being adapted to pass freely through said eye plate, said arm having therein a longitudinally extending slot in which is freely received the screw of the clamp of the matrix on said stem.

4. In a dental matrix retainer, a plate having an eye therein for the passage of the leg of a matrix therethrough, said plate having the terminal edge convex so that its centre may rest against the contiguous portion of the matrix and a tongue carried by said plate and acting to press the matrix, against the action of said plate, against the tooth.

5. In a dental matrix retainer, a movable member, the latter having a plate adapted to have the matrix engaged therewith, a carrier for said member, and a plate on said member having therein an eye adapted to have the leg of a matrix passed therethrough for closing the latter, said plate being connected with said holder, and a lip on said member entering said holder and a resilient tongue to thrust against the side of the matrix to press the latter against the tooth.

6. In a dental matrix retainer, a movable member, the latter being adapted to have the matrix engaged therewith, a holder for said member, and a stop on said member movable therewith adapted to abut a shoulder on said holder to limit the motion of said member in closing the body of the matrix.

JAMES W. IVORY.

Witnesses:—
JOHN A. WIEDERSHEIM,
N. BUSSINGER.